UNITED STATES PATENT OFFICE.

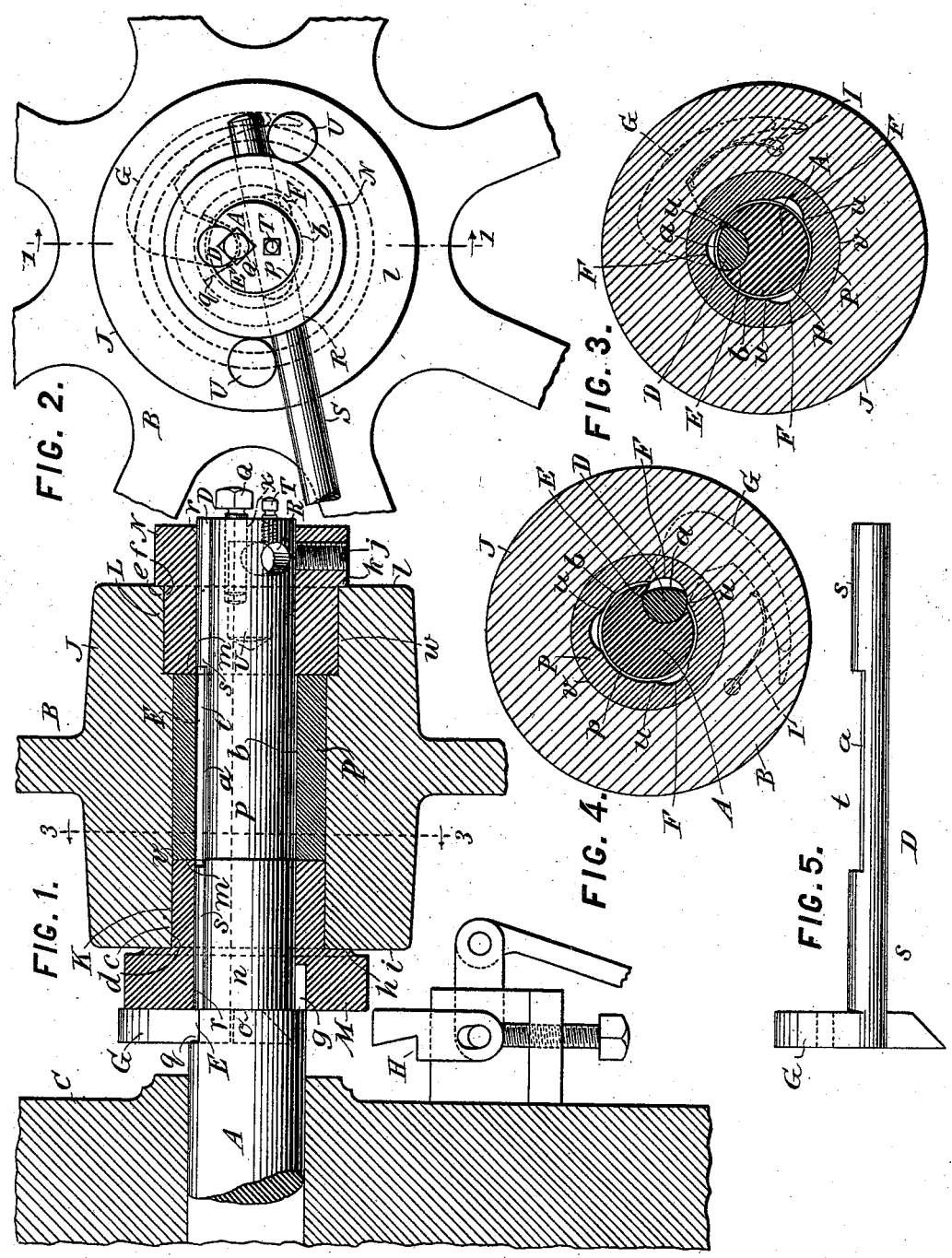

FRANK M. LEAVITT, OF BROOKLYN, NEW YORK, ASSIGNOR TO THE E. W. BLISS COMPANY, OF SAME PLACE.

CLUTCH FOR POWER-PRESSES.

SPECIFICATION forming part of Letters Patent No. 568,575, dated September 29, 1896.

Application filed January 15, 1896. Serial No. 575,608. (No model.)

*To all whom it may concern:*

Be it known that I, FRANK M. LEAVITT, a citizen of the United States, residing in Brooklyn, in the county of Kings and State of New York, have invented certain new and useful Improvements in Clutches for Power-Presses and other Purposes, of which the following is a specification.

This invention relates to clutches for locking together relatively rotative parts, such, for example, as the passive shaft and the driven pulley of a power-press. Clutches for this and analogous purposes usually consist of an oscillatory key carried by the one part, usually the driven part, and movable into and out of engagement with a reciprocal face or shoulder carried by the other part, usually the driving part, the key when in the active position transmitting the motion of the driving to the driven part, and when in the inactive position permitting free relative rotation of either part. One example of such a clutch is shown in my Letters Patent No. 370,198, dated September 20, 1887, in which a partially-round key is fitted in a partially-round keyway in the shaft at the portion of the latter on which the hub of the pulley has its bearing, and the inner bearing-face of the hub has a concave socket into which the key can pass when oscillated to lock the parts together. The flattened portion of the key is usually of like curvature to the bearing portion of the shaft, and when in the inactive position completes this bearing portion across the keyway. The key has been released by a projecting tail caught by a stop, and has been thrown to the active position by a spring when this tail is freed. With clutches of this character much trouble has occurred through the wear of the corner of the key-socket in the hub on the bearing-surface of the shaft during a large proportion of time in which the pulley runs on the shaft. The bearing on the shaft is in some cases so injured by the biting of this edge during use as to greatly impair it, and its impairment immediately acts to impair the inner face of the hub.

My present invention aims to provide improvements especially applicable to clutches of the general character last described, whereby the danger of impairment of the bearing-surfaces between the shaft and hub shall be removed, and it also aims to provide improvements in the construction of the hub whereby a hard-metal surface for coacting with the key can be conveniently and economically attained.

To this end in carrying out my present improvements in their preferred form and as applied to a clutch of the general character described, I provide continuous cylindrical bearings on the shaft and pulley for receiving the relative movement of these parts and dispose the key inwardly of these bearings, forming the exterior of the shaft opposite the active portion of the key of a somewhat lesser diameter than that of the adjacent interior of the hub, so that these portions shall be out of contact, leaving between them a small annular space sufficient to insure against any biting between their surfaces; and I provide an annular hard-metal bush within that portion of the hub which is acted upon by the key forming the locking socket or sockets in this bush, so that the wear of use shall be received by this bush, which is keyed or otherwise suitably fixed within the hub, and I provide certain other features of improvement, which will be hereinafter fully set forth.

In the accompanying drawings, Figure 1 is a fragmentary vertical section, partly in elevation, of the frame, pulley, and shaft of a power-press cut on the line 1 1 of Fig. 2, showing the key locked in the passive position. Fig. 2 is a fragmentary end elevation of the shaft and pulley, showing the hand-bar for manual operation in position. Fig. 3 is a vertical transverse section cut through the hub of the pulley on the line 3 3 of Fig. 1 and showing the key in the passive position. Fig. 4 is a similar view showing the key in the active position, and Fig. 5 is a side elevation of the key alone.

Referring to the drawings, let A indicate the driven shaft, B the driving-pulley, and C the frame, of a power-press. D is the locking-key; E, the keyway therefor in the shaft; F, the key-sockets therefor in the hub; G, the tail for tilting the key; H, the stop catching this tail; I, the spring operating the tail, and J the hub of the pulley. These parts may be of any usual or suitable construction, and, as shown, are, in their general features, of well-known construction and operation, the pulley running freely on the bearings of the shaft, except when the key is tilted to bring its cylindrical portion into the corresponding socket F, in which event the pulley drives the shaft until the key is tilted to bring its arc-shaped portion $a$ opposite the socket, which portion, being of the same diameter as the inner cylindrical part $b$ of the hub, or of slightly less diameter than this part, permits the further rotation of the hub without the driving of the shaft. The stop H stands in the path of the tail G and brings the tail to the disengaging position at a predetermined point in the rotation of the shaft, holding the tail in this position until the catch is moved from under the tail, whereupon the latter swings outwardly, throwing the key into the active position as soon as one of the key-sockets F, of which three are usually employed, comes opposite the key and permits it to rise thereunder, whereupon the shaft will be driven until the tail is again caught by the stop H.

According to my present improvements I provide the shaft and hub with distinct bearing portions and clutching portions, and make the bearing portions cylindrical and of a suitable running fit and proper bearing material and the clutching portions of such relative size that a sufficient space shall exist between the adjacent faces of the shaft and hub to avoid contact between these parts at this point and prevent any wear or cutting of the shaft by the corners of the key-sockets in the hub during the independent rotation of the latter. Two bearing portions are preferably provided, one near each end of the hub, and a continuous intermediate clutching portion is provided at the center of the hub between these bearings. The inner bearing (lettered K) consists of a cylindrical wall $c$ in the hub, fitting a cylindrical wall $d$, carried by the shaft, and the outer bearing (lettered L) consists of a larger cylindrical wall $e$ at the outer side of the hub, fitting a corresponding cylindrical wall $f$, carried by the shaft. The wall $d$ is preferably formed on a collar M, of wrought metal or other suitable material, and the wall $f$ is preferably formed on a collar N, of like material. The collar M is keyed to the shaft by a key $g$, and has a side face $h$, engaging the end $i$ of the hub and limiting inward movement of the latter. The collar N is suitably fixed to the shaft, as by the set-screw $j$, and has a shoulder $k$, engaging the outer end $l$ of the hub to hold the latter in position against outward displacement. The collars M and N each preferably end in an abrupt wall $m$, and it is between these walls that the clutching provisions act.

To receive the collar M, the shaft A is preferably reduced at $n$ to fit the bore of the collar and provided with a shoulder $o$, determining the inner position of the latter. At the end $m$ of the inner collar the shaft is again reduced slightly and continues from this end outwardly in a cylindrical part $p$, on the outer end of which the collar N fits and is fixed.

The keyway E is a cylindrical bore extending from the outer end of the shaft partially through the latter and partially through the collars N and M to the inner side of the inner collar, beyond which it is enlarged at $q$ to permit the oscillation of the tail G. In the cylindrical portions $r$ of this keyway, within the collars, the ends $s$ of the shaft are held, while between these portions the cut-away part $t$ extends. The axis of the keyway is so disposed that the cylindrical portion of the key will extend considerably beyond the periphery of the shaft, and the periphery of the adjacent portion of the hub and the key-sockets F in the latter are struck from this axis and correspond substantially with the diameter of the keyway. The face $a$ of the key is struck from the axis of the shaft as an arc of a circle, which equals or nearly equals in diameter the diameter of the inner face $p$ of the shaft. The diameter of the face $b$ is sufficiently in excess of the diameter of the part $p$ of the shaft opposite it to leave the desired space between these parts to insure their being out of contact. The diameter of the part $b$ is preferably the same as that of the part $n$ of the shaft. By this construction there is no contact between the interior $b$ of the hub and the exterior $p$ of the shaft, and the latter is prevented from injury by the corners $u$ of the sockets F. These corners have usually been made of hardened steel to enable them to resist the shocks when the key is thrown into the socket and their biting effect on the softer metal of the shaft has been very disadvantageous. By the relative enlargement of the internal clutching portion of the hub as compared with the adjacent portion of the shaft all disadvantages of this character are obviated.

Heretofore to protect the corners $u$ of the sockets F it has been customary to insert steel keys into the cast-metal hub. One feature of my present improvements avoids the necessity of this by providing a steel or other hard-metal socket-bushing P, in which the sockets F are formed and which is set into and fixed in the hub in any suitable manner, as by pressing or shrinking. This bush is preferably cylindrical externally, and is best constructed of the same diameter as the bearing-surface $c$ of the hub, so that the one bore $v$ through the hub suffices both for this bearing and for receiving the bush. At its outer end the hub preferably has a larger bore $w$, extending inwardly to the end of the bush P, the surface of which bore serves as the bearing-surface $e$ of the hub, and into which bore the collar N passes. By thus constructing the hub its interior can be finished or bored out from one side, thus avoiding the necessity of turning the wheel A in the lathe, as would be necessary in case the enlarged end bearings K and L and the intermediate clutch portion were formed in one integral casting, as would be done if that feature of my invention which provides the improved wearing-bushing was not employed.

To provide for holding the key in the inactive position, as is required when the clutch is not to operate, the pin Q is employed, and a bore $x$ is formed partly in the end of the shaft and partly in the end of the key, into which bore the pin is inserted, thus holding the key against rotation in the shaft, as shown in Figs. 1 and 2. This is desirable when the shaft is to be slowly moved around from its usual position of rest and independently of the wheel. For thus moving the shaft a bar-socket R is bored through the collar N and the shaft beyond the end of the hub, through which bore a hand-bar S may be passed and in which it may be locked by a bolt T for giving the desired hold and leverage to effect independent movement of the shaft. To enable the movement of the wheel as well as the shaft by this bar, pins U U are fixed in the outer side of the hub and project beyond its end face $l$ and into the path of the bar S, so that sufficient movement of the bar will cause it to embrace these pins and then move the wheel and the shaft together, if desired.

The hub J is usually of cast metal, and the collars M and N, on which it bears, will be preferably made of machine-steel or of other suitable material of a character adapted to make a good bearing-surface for the cast-metal hub.

In ordinary operation the pin Q and the bar S will be removed and the wheel B will run freely on the bearings until the key is operated to lock the shaft to the wheel. As soon as the key is operated it moves into the first socket F coming opposite it, and instantly the shaft is driven from the wheel, thus continuing until the key is released by the stop H, which will occur at the end of one revolution of the shaft.

It will be seen that my invention provides improvements which can be readily and advantageously availed of for clutches operating on the principle described, and it will be understood that the invention is not limited to the exact details of construction and arrangement nor to the exact combination of features of improvement set forth and shown as embodying its preferred form, since it can be adopted in whole or in part, according to such modifications as circumstances or the judgment of those skilled in the art may dictate, without departing from the spirit of the invention.

What I claim is, in clutches for power-presses and other purposes, the following-defined novel features and combinations, substantially as and for the purpose hereinbefore set forth, namely:

1. In clutches and the like, a rotative shaft and a rotative wheel rotatively mounted thereon, the one a driven and the other a driving part, and the one having a keyway and the other a key-socket, a key in said keyway and movable into and out of said socket for locking said parts together, said parts having cylindrical bearing portions beyond said key, and having clutching portions inwardly of said bearing portions, the clutching portion of said shaft being of relatively small diameter, and the opposite portion of said wheel being of greater diameter, whereby said clutching portions are out of contact with each other, and an annular space exists between their adjacent faces, and neither can be impaired by the other during independent rotation of said parts.

2. In clutches and the like, a rotative shaft and a rotative wheel, the one carried by the other, and the one a driven and the other a driving part, the one having a keyway and the other having a key-socket, and a key in said keyway moving into said socket to lock the parts together, said shaft having relatively large cylindrical bearings spaced apart, and an intermediate portion of relatively small diameter, said key disposed inwardly of said bearings and having an active portion intermediate thereof, and said wheel having a hub having relatively large cylindrical bearings fitting and rotative on the bearings of said shaft, and a contracted intermediate portion of greater diameter than the adjacent portion of said shaft, out of contact therewith, and having a key-socket opposite the active portion of said key, whereby intermediate of said bearings said shaft and hub are out of contact, substantially as and for the purpose set forth.

3. In clutches and the like, a shaft A having separated bearings, in combination with a wheel B having separated bearings fitting and turning on those of said shaft, an internal hard-metal bushing P fixed within said wheel between said bearings, said shaft having a longitudinal keyway, and said bushing having a reciprocal longitudinal key-socket between said bearings, and a key D in said keyway and movable into said socket for locking said shaft and wheel together.

4. In clutches and the like, a shaft A and a wheel B, said shaft having collars M and N having bearings $d\,f$, a keyway E traversing said shaft and collars, and a portion $p$ intermediate of said collars and of less diameter than the bearings thereof, and said wheel having bearings $c$ and $e$ rotatively fitting said bearings $d$ and $f$, and intermediate portion $b$ opposite and of greater diameter than said portion $p$, and having the key-socket F, and a key D in said keyway and movable into said socket to lock the parts together.

5. In clutches and the like, a shaft A having a bearing $d$, a portion $p$ of less diameter than said bearing, and a bearing $f$ of greater diameter than said bearing $d$, and a keyway E traversing said bearings and said portion, and said wheel having a long bore $v$ fitting said bearing $d$, a hard-metal bushing P fitting and fixed in said bore outwardly of said bearing $d$, and having a key-socket F, and a bore extending from said bore $v$ outwardly and fitting and receiving said bearing $f$, and a key D in said keyway and movable into said socket for locking the parts together.

In witness whereof I have hereunto signed my name in the presence of two subscribing witnesses.

FRANK M. LEAVITT.

Witnesses:
WILLARD P. SCHENCK,
JOSEPH H. WINZLER.